(12) United States Patent
Mugiraneza et al.

(10) Patent No.: US 12,524,102 B2
(45) Date of Patent: Jan. 13, 2026

(54) DISPLAY DEVICE

(71) Applicant: SHARP KABUSHIKI KAISHA, Sakai (JP)

(72) Inventors: Jean Mugiraneza, Sakai (JP); Masashi Mayumi, Sakai (JP); Kosuke Nagata, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 240 days.

(21) Appl. No.: 18/276,176

(22) PCT Filed: Mar. 1, 2021

(86) PCT No.: PCT/JP2021/007650
§ 371 (c)(1),
(2) Date: Aug. 7, 2023

(87) PCT Pub. No.: WO2022/185368
PCT Pub. Date: Sep. 9, 2022

(65) Prior Publication Data
US 2024/0094844 A1    Mar. 21, 2024

(51) Int. Cl.
*G06F 3/041* (2006.01)
*H10K 59/40* (2023.01)

(52) U.S. Cl.
CPC ......... *G06F 3/04164* (2019.05); *H10K 59/40* (2023.02); *G06F 2203/04107* (2013.01)

(58) Field of Classification Search
CPC ....... G06F 3/04164; G06F 2203/04107; G06F 3/0412; G06F 3/041; G06F 3/0446; H10K 59/40; H10K 59/126
See application file for complete search history.

(56) References Cited

U.S. PATENT DOCUMENTS

| 10,289,225 | B2 | 5/2019 | Jin et al. |
| 2009/0160790 | A1 | 6/2009 | Fukushima et al. |
| 2014/0043283 | A1* | 2/2014 | Kim ........................ G06F 3/046 345/174 |
| 2019/0302959 | A1* | 10/2019 | Clark .................... G06F 3/0412 |
| 2020/0004368 | A1* | 1/2020 | Kim .................... G06F 3/04164 |

FOREIGN PATENT DOCUMENTS

| JP | 2009-003796 A | 1/2009 |
| JP | 2012-022427 A | 2/2012 |
| JP | 2020-035181 A | 3/2020 |
| WO | 2016140282 A1 | 9/2016 |

* cited by examiner

*Primary Examiner* — Matthew A Eason
*Assistant Examiner* — Chayce R Bibbee
(74) *Attorney, Agent, or Firm* — ScienBiziP, P.C.

(57) ABSTRACT

A display device includes a display panel and a touch panel, wherein the display panel has a light-emitting layer, a first electrode, and a second electrode, the touch panel has a first touch electrode, and a second touch electrode that is driven by a driving signal for detecting a touch in response to a change in mutual capacitance between the first touch electrode and second touch electrode, and the display device further includes a shield electrode formed between the first electrode and touch panel to be applied with a shield-electrode signal.

5 Claims, 21 Drawing Sheets

DISPLAY DEVICE

TECHNICAL FIELD

The disclosure relates to a display device including a display panel for displaying an image, and a touch panel formed over the display panel.

BACKGROUND ART

A known display device (Patent Literature 1) includes a display panel including organic light-emitting diodes (OLEDs) for displaying an image, and a touch panel formed over the display panel.

Another known display device (Patent Literature 2) includes a display panel including liquid-crystal display elements, and a touch panel formed over the display panel.

CITATION LIST

Patent Literatures

Patent Literature 1: U.S. patent Ser. No. 10/289,225
Patent Literature 2: Japanese Unexamined Patent Application Publication No. 2012-022427

SUMMARY

Technical Problem

The display device described in Patent Literature 1 is configured such that a touch electrode provided in the touch panel is disposed over a thin-film encapsulation (TFE) of the OLEDs; hence, the touch panel unfortunately receives a large noise from the OLEDs.

The display device described in Patent Literature 2 is provided with a shield layer between the display panel and touch panel. However, the shield layer, which is in ground connection, unfortunately cannot sufficiently exert its function, i.e., blocking a noise from the display panel to the touch panel.

One aspect of the disclosure aims to offer a display device that can effectively block a noise from its display panel to its touch panel.

Solution to Problem

To solve the above problem, a display device according to one aspect of the disclosure is a display device including the following: a display panel for displaying an image; and a touch panel formed over the display panel to detect a touch to the display panel, wherein the display panel has the following: a light-emitting layer that emits light to display the image; a first electrode disposed closer to the touch panel than the light-emitting layer, to apply a voltage to the light-emitting layer; and a second electrode disposed opposite the touch panel with respect to the light-emitting layer, to apply the voltage to the light-emitting layer, the touch panel has the following: a first touch electrode; and a second touch electrode that is driven by a driving signal for detecting the touch in response to a change in mutual capacitance between the first touch electrode and the second touch electrode, and the display device further includes a shield electrode formed between the first electrode and the touch panel to be applied with a shield-electrode signal.

To solve the above problem, a display device according to another aspect of the disclosure is a display device including the following: a display panel for displaying an image; and a recognition panel formed over the display panel to recognize an approach of a detection target to the display panel, wherein the display panel has the following: a light-emitting layer that emits light to display the image; a first electrode disposed closer to the recognition panel than the light-emitting layer, to apply a voltage to the light-emitting layer; and a second electrode disposed opposite the recognition panel with respect to the light-emitting layer, to apply the voltage to the light-emitting layer, the recognition panel has the following: a first recognition electrode; and a second recognition electrode that, in a sensing mode for recognizing the approach of the detection target, is driven by a recognition signal for recognizing the approach of the detection target in response to a change in mutual capacitance between the first recognition electrode and the second recognition electrode, and the display device further includes a shield electrode formed between the first electrode and the recognition panel to reduce a noise from the first electrode to the recognition panel, and that is applied with a shield-electrode signal related to the detection target.

To solve the above problem, a display device according to further another aspect of the disclosure is a display device including the following: a display panel for displaying an image; and a recognition panel formed over the display panel to recognize an approach of a detection target having a coil to the display panel through electromagnetic induction, wherein the display panel has the following: a light-emitting layer that emits light to display the image; a first electrode disposed closer to the recognition panel than the light-emitting layer, to apply a voltage to the light-emitting layer; and a second electrode disposed opposite the recognition panel with respect to the light-emitting layer, to apply the voltage to the light-emitting layer, the recognition panel has an antenna electrode formed in a looped manner to recognize the approach of the detection target in response to a change in electromagnetic field, and that, in a sensing mode for recognizing the approach of the detection target, is applied with an antenna-electrode signal related to the detection target, and the display device further includes a shield electrode formed between the first electrode and the recognition panel to reduce a noise from the first electrode to the recognition panel.

Advantageous Effect of Disclosure

The aspects of the disclosure can offer a display device that can effectively block a noise from its display panel to its touch panel.

DESCRIPTION OF EMBODIMENTS

First Embodiment

Figure 1:
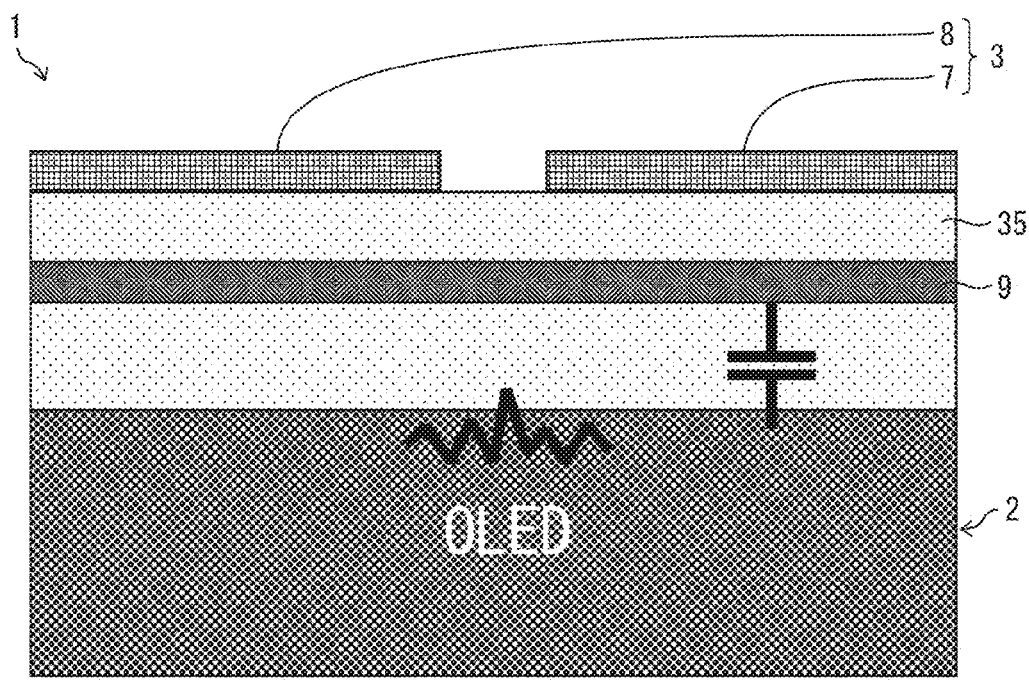
FIG. 1 is a schematic sectional view of a display device according to a first embodiment.
Figure 2:
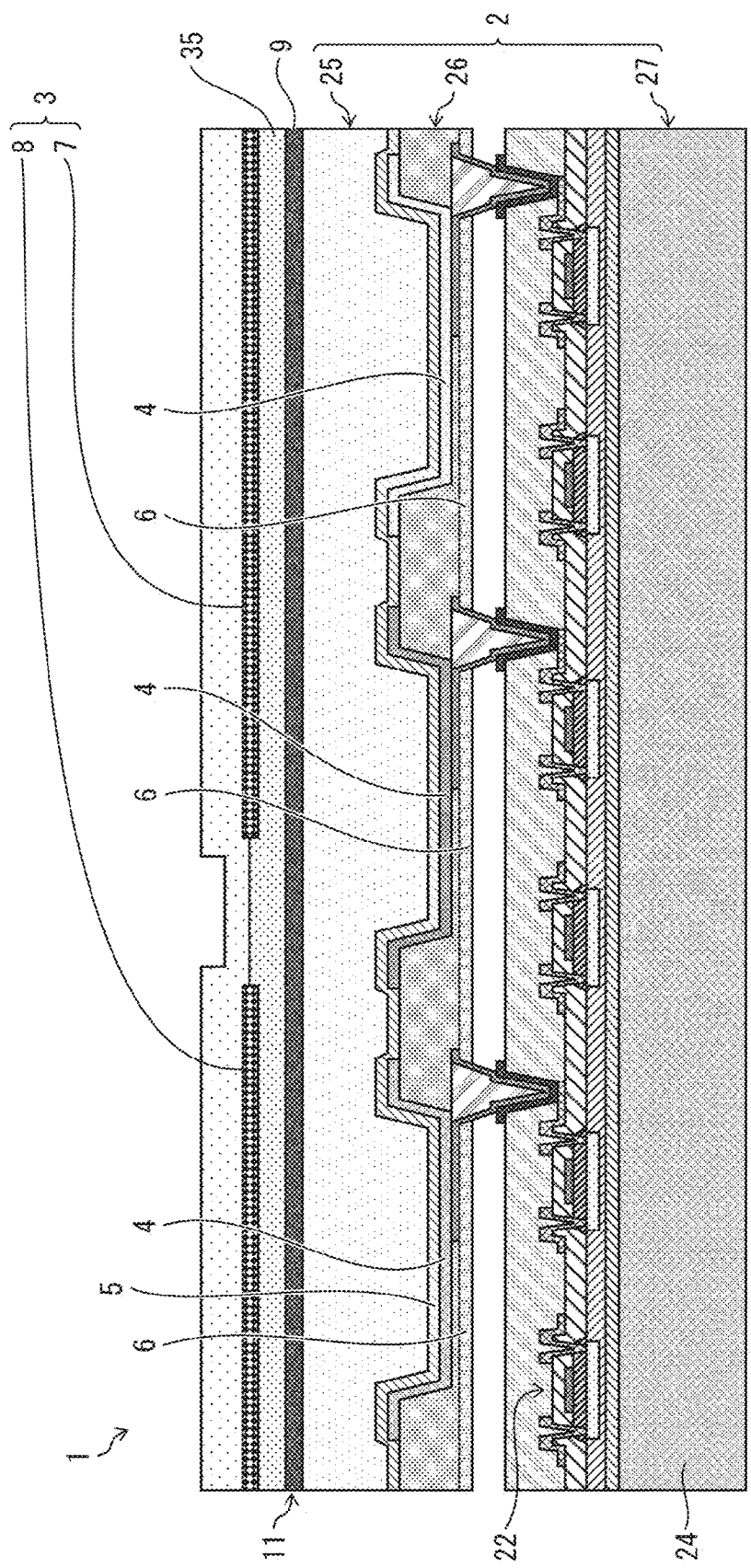
FIG. 2 is a detailed sectional view of the display device.
Figure 3:
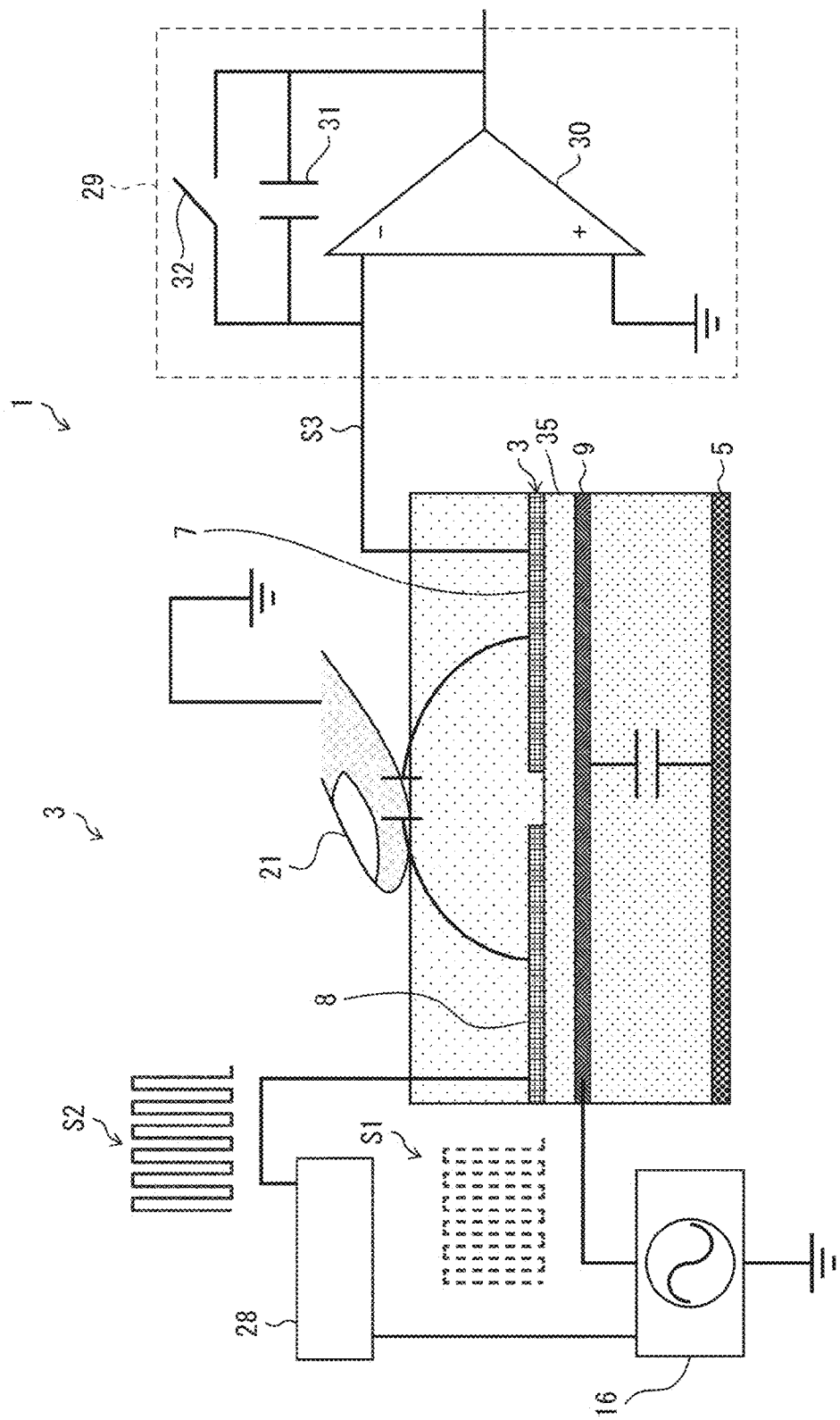
FIG. 3 is a schematic diagram illustrating an operational principle of a shield electrode provided in the display device.

FIG. 1 is a schematic sectional view of a display device 1 according to the first embodiment. FIG. 2 is a detailed sectional view of the display device 1. FIG. 3 is a schematic diagram illustrating an operational principle of a shield electrode 9 provided in the display device 1.

The display device 1 includes a display panel 2 for displaying an image, and a touch panel 3 formed over the display panel 2 to detect a touch to the display panel 2. The display panel 2 includes, as illustrated in FIG. 2, a backplane 27, an OLED light-emitting layer 26, and a thin-film encapsulation (TFE) layer 25.

The OLED light-emitting layer 26 has the following: a light-emitting layer 4 that emits light to display the image on the display panel 2; a first electrode 5 disposed closer to the touch panel 3 than the light-emitting layer 4, to apply a voltage to the light-emitting layer 4; and a second electrode 6 disposed the touch panel 3 with respect to the light-emitting layer 4, to apply the voltage to the light-emitting layer 4. The first electrode 5 can be a cathode for instance.

The touch panel 3 has the following: a first touch electrode 7; and a second touch electrode 8 that is driven by a driving signal S2 for detecting a touch of the detection target 21 in response to a change in mutual capacitance between the first touch electrode 7 and second touch electrode 8 based on the touch. The detection target 21 can be a finger for instance.

The display device 1 further includes a shield electrode 9 formed between the first electrode 5 and touch panel 3 to be applied with a shield-electrode signal S1. The shield-electrode signal S1 includes a signal for reducing a noise that propagates from the first electrode 5 to the touch panel 3. The shield-electrode signal S1 may include a signal based on the driving signal S2.

An insulating layer 35 is formed between the shield electrode 9, and the first touch electrode 7 and second touch electrode 8.

The display device 1 further includes a shield-electrode signal generator 16 that generates the shield-electrode signal S1 in response to the driving signal S2. The shield-electrode signal generator 16 is composed of thin-film transistors 22 for driving the light-emitting layer 4.

The backplane 27 includes a thin-film transistor (TFT) substrate 24. The thin-film transistors 22 are formed on the TFT substrate 24.

The display device 1 further includes a driving signal generator 28 that generates the driving signal S2 and supplies it to the first touch electrode 7 and shield-electrode signal generator 16.

The touch panel 3 includes a read circuit 29 that reads a first touch-electrode signal S3 from the first touch electrode 7 in response to a capacitance change between the first touch electrode 7 and second touch electrode 8. The read circuit 29 includes the following: an integrator having two inputs; and an integral capacitance 31 and a switch 32 provided in parallel with each other between the output of the integrator 30 and one of the inputs of the same. The other input of the integrator 30 is grounded.

As described above, the shield electrode 9 is formed between the first electrode 5, constituting the OLED light-emitting layer 26, and the first touch electrode 7 and second touch electrode 8, both constituting the touch panel 3. Moreover, the shield electrode 9 is applied with the shield-electrode signal S1 similar to the driving signal S2 that is applied to the second touch electrode 8.

The shield electrode 9 is disposed directly on the thin-film encapsulation layer 25, which is formed over the OLED light-emitting layer 26.

Figure 4:
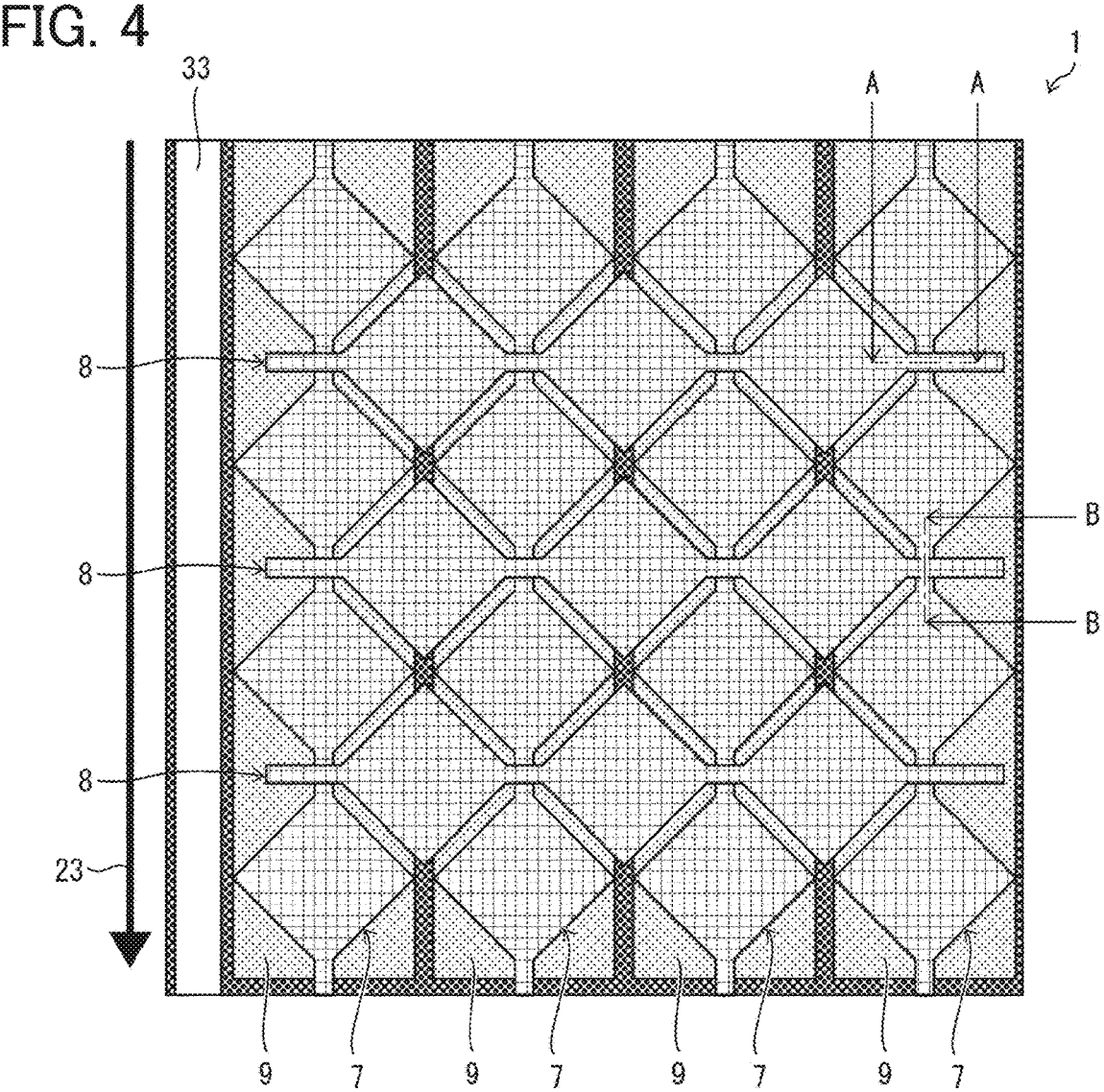
FIG. 4 is a plan view of the display device.
Figure 5:
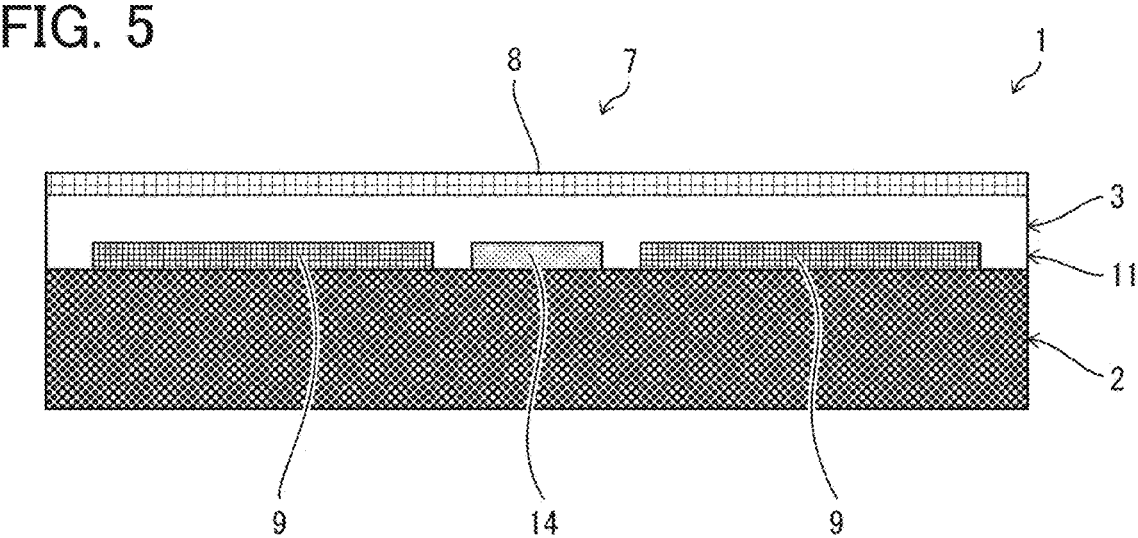
FIG. 5 is a sectional view taken along line AA in FIG. 4.

FIG. 4 is a plan view of the display device 1. FIG. 5 is a sectional view taken along line AA in FIG. 4.

Figure 6:
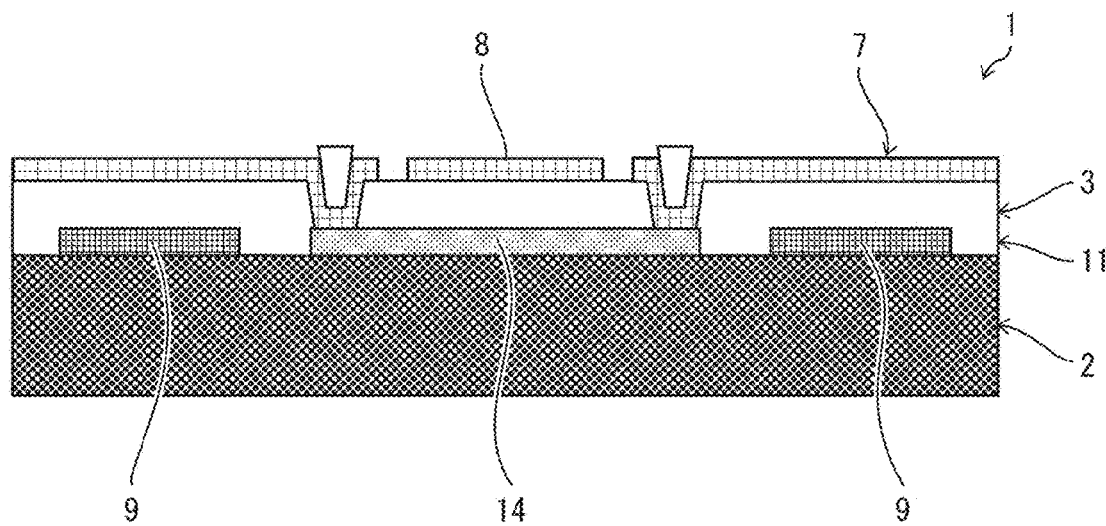
FIG. 6 is a sectional view taken along line BB in FIG. 4.

FIG. 6 is a sectional view taken along line BB in FIG. 4.

The first touch electrode 7 is composed of a plurality of first touch electrodes 7 formed in such a manner that a repeated pattern of diamonds extends along an arrow 23, which denotes the scanning direction of an image that is to be displayed on the display panel 2. The second touch electrode 8 is composed of a plurality of second touch electrodes 8 formed in such a manner that a repeated pattern of diamonds extends in a direction intersecting with the arrow 23, which denotes the scanning direction.

The shield electrode 9 is composed of a plurality of shield electrodes 9 formed in a shield electrode layer 11 between the display panel 2 and touch panel 3, so as to correspond to the first touch electrodes 7 in a striped manner along the arrow 23. Each first touch electrode 7 includes a bridge wire 14 formed in the shield electrode layer 11 to avoid intersection with the second touch electrodes 8.

The shield electrodes 9 are formed so as to extend along the arrow 23, which denotes the image scanning direction. The bridge wires 14 are formed in the shield electrode layer 11, in which the shield electrodes 9 are formed.

Figure 7:
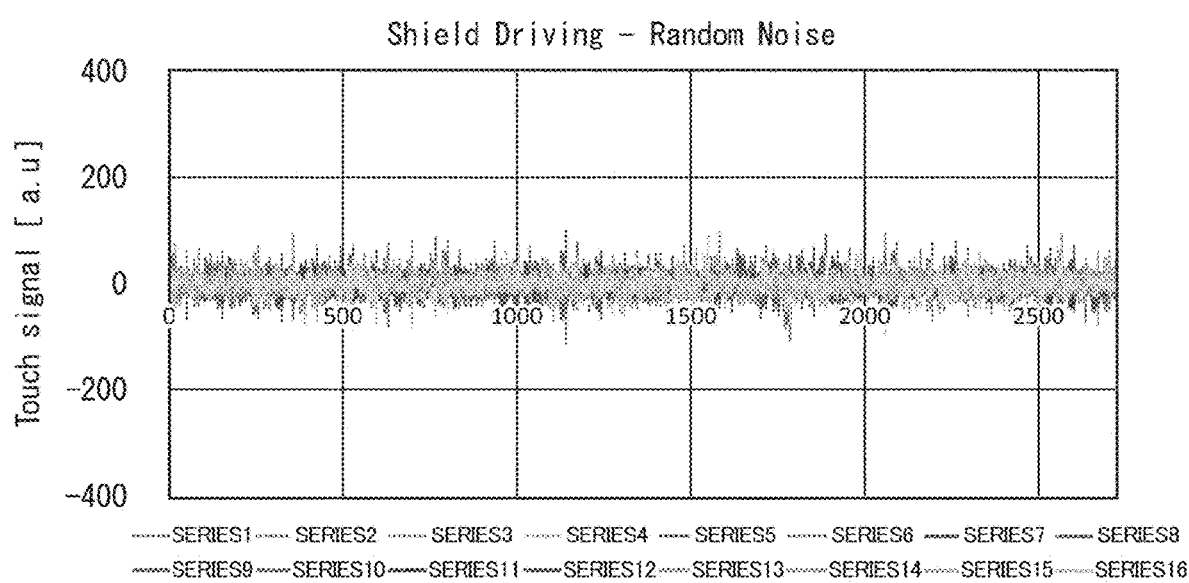
FIG. 7 is a graph showing a noise that occurs in the display device.
Figure 8:
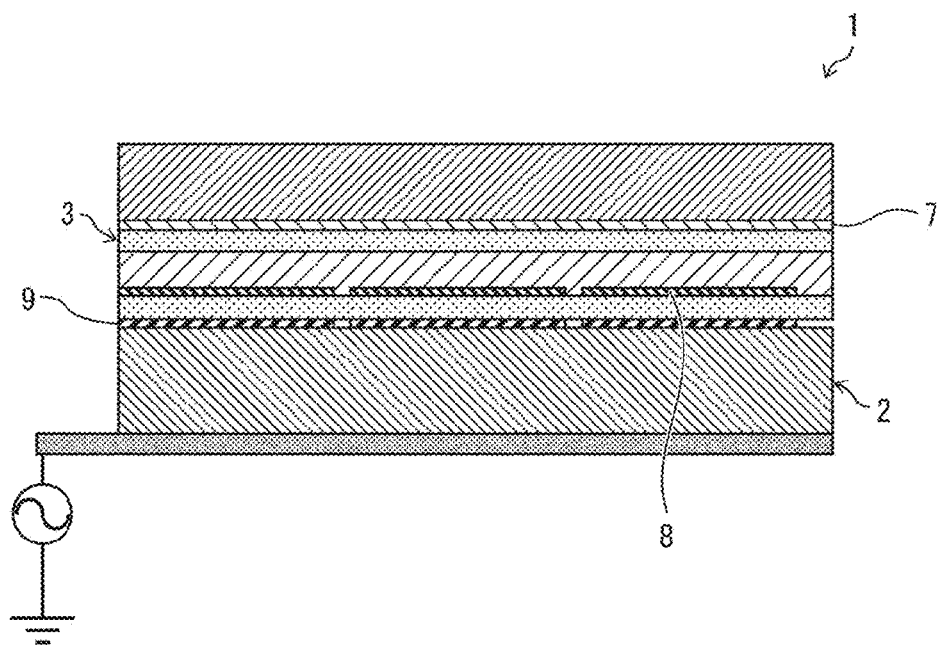
FIG. 8 is a sectional view of the display device with the shield electrodes provided.
Figure 9:
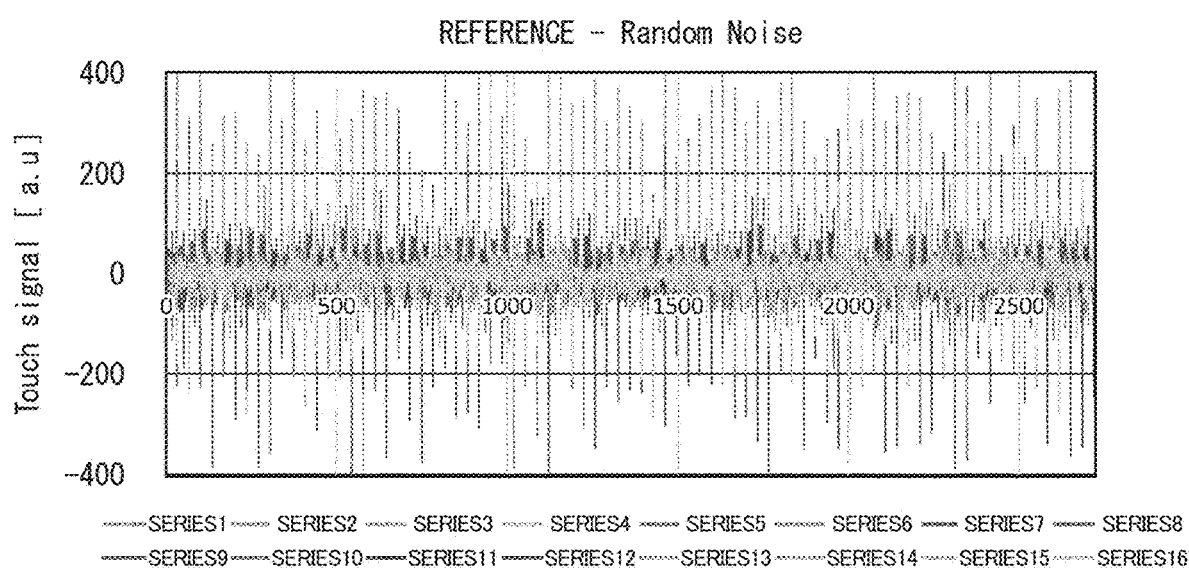
FIG. 9 is a graph showing a noise that occurs in a display device according to a comparative example.
Figure 10:
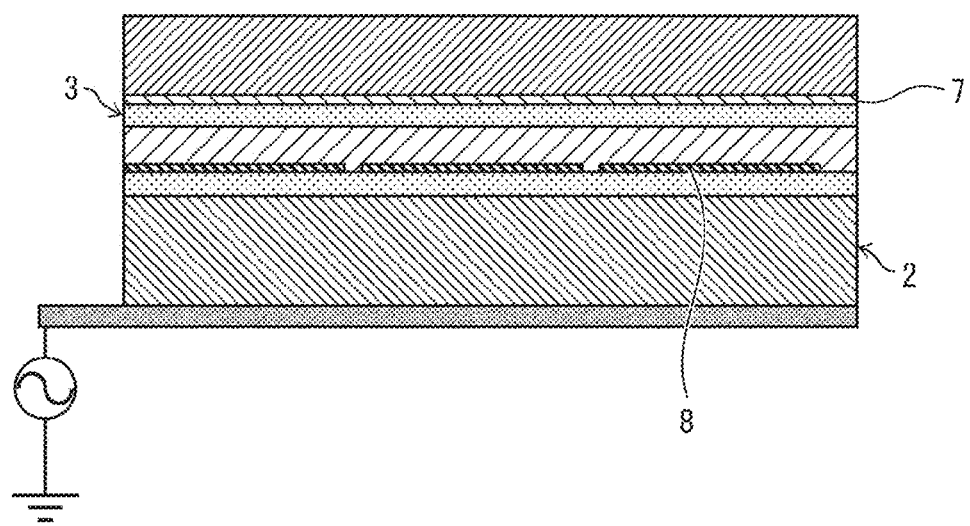
FIG. 10 is a sectional view of the display device according to the comparative example without the shield electrodes provided.

FIG. 7 is a graph showing a noise that occurs in the display device 1. FIG. 8 is a sectional view of the display device 1 with the shield electrodes 9 provided. FIG. 9 is a graph showing a noise that occurs in a display device according to a comparative example. FIG. 10 is a sectional view of the display device according to the comparative example without the shield electrodes 9 provided.

Upon application of a noise signal (Vpp=2V) to the display panel 2, as illustrated in FIG. 8 and FIG. 10, the noise of the first touch-electrode signal S3 read from the first touch electrode 7 of the display device 1 with the shield-electrode signal S1 applied to the shield electrode 9 reduced, as illustrated in FIG. 7 and FIG. 9, further than that of a first touch-electrode signal read from the first touch electrode 7 of the display device according to the comparative example, which includes no shield electrodes 9.

Figure 11:
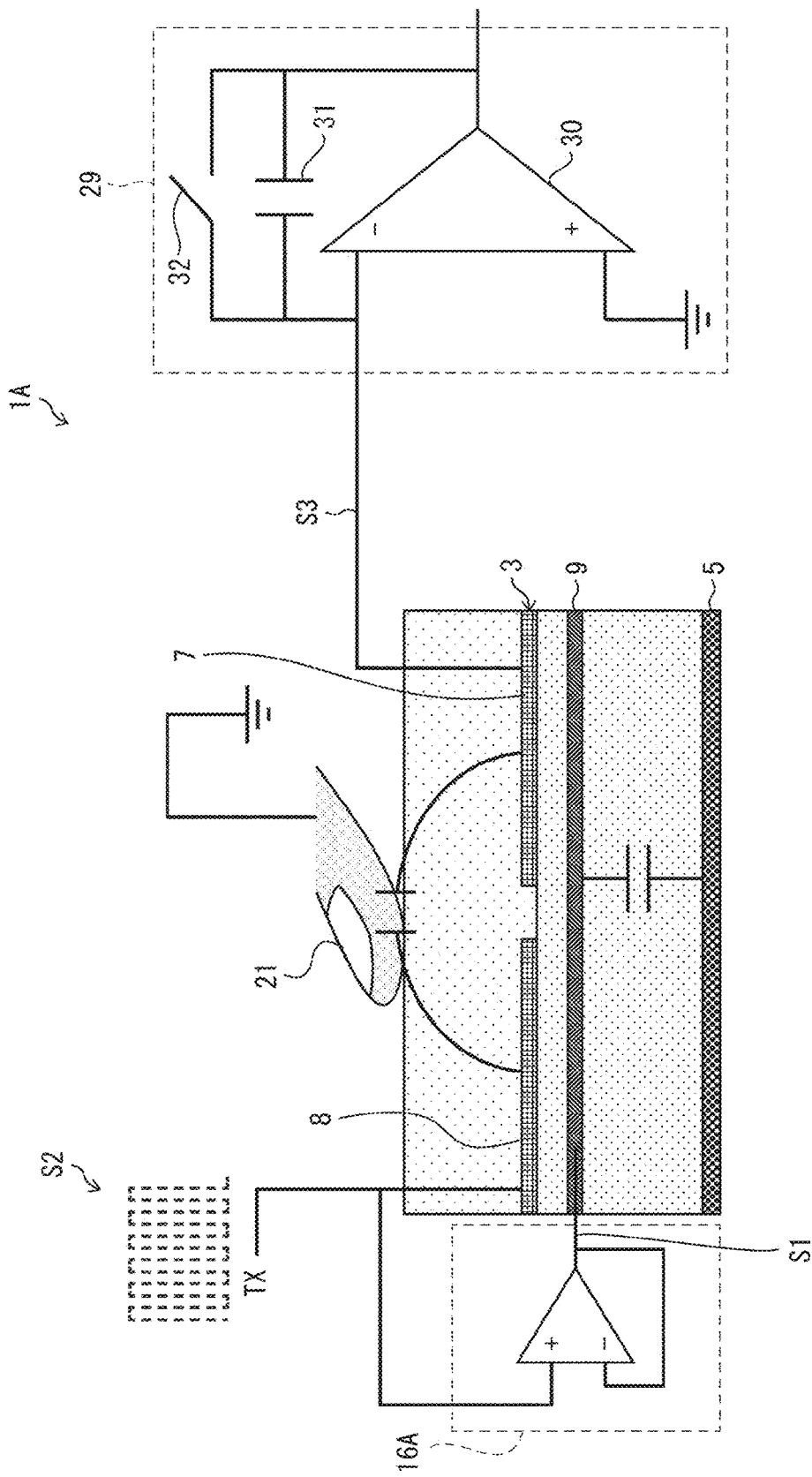
FIG. 11 is a schematic diagram illustrating another operational principle of the shield electrode.

FIG. 11 is a schematic diagram illustrating another operational principle of the shield electrode 9. Constituents similar to the foregoing constituents will be denoted by similar reference signs, and the detailed description of these constituents will not be repeated.

The shield-electrode signal S1 that is applied to the shield electrodes 9 may be a replicated signal of the driving signal S2, which is for driving the second touch electrode 8. A display device 1A includes a shield-electrode signal generator 16A that supplies, to the shield electrode 9, the shield-electrode signal S1 being a replicated signal of the driving signal S2.

As described above, the shield electrode 9 is driven by the shield-electrode signal S1 similar to the driving signal S2, which is applied to the second touch electrode 8, in order to reduce a parasitic resistance on the second touch electrode 8.

Figure 12:
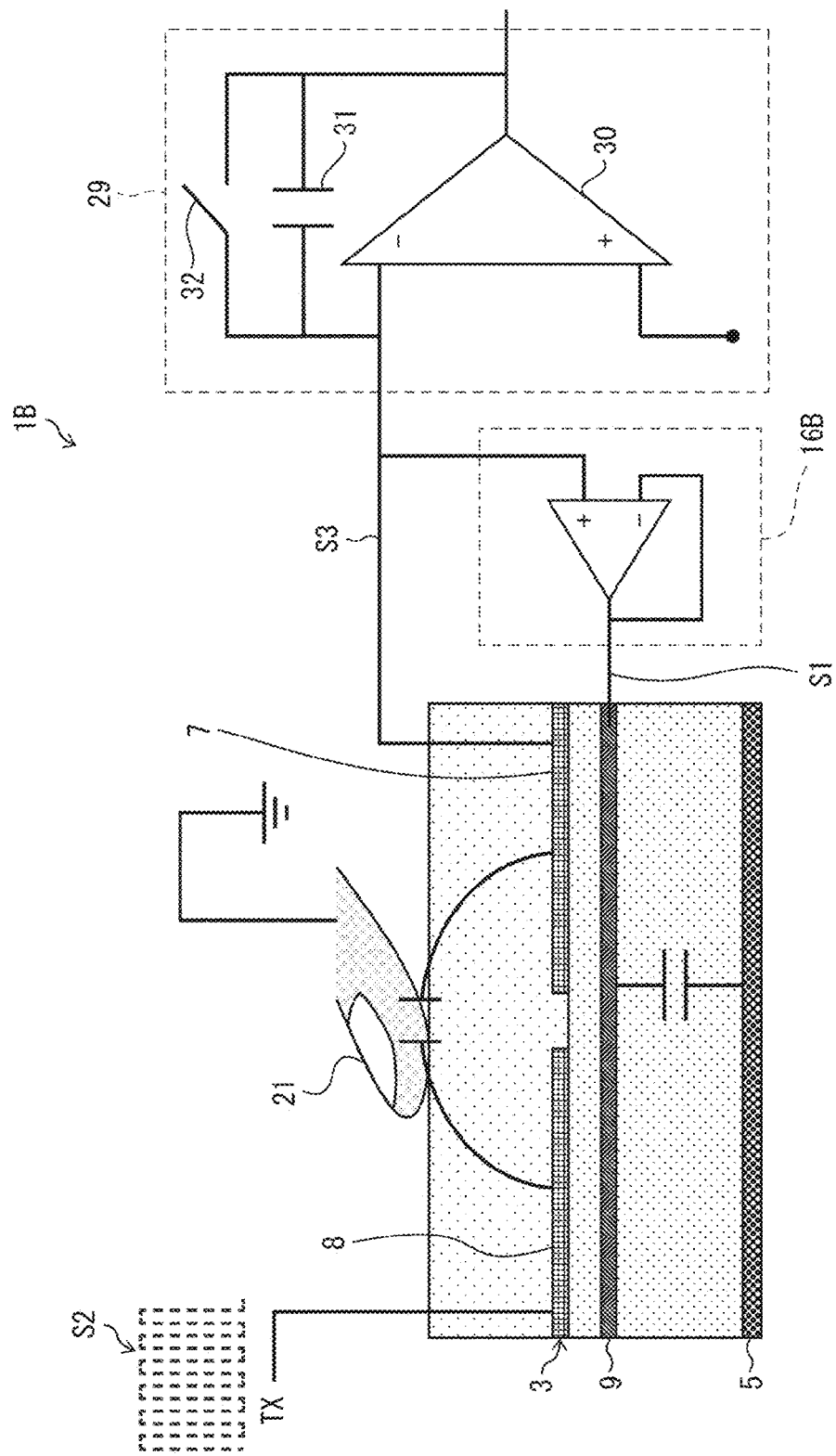
FIG. 12 is a schematic diagram illustrating further another operational principle of the shield electrode.

FIG. 12 is a schematic diagram illustrating further another operational principle of the shield electrode 9. Constituents similar to the foregoing constituents will be denoted by similar reference signs, and the detailed description of these constituents will not be repeated.

The shield-electrode signal S1 that is applied to the shield electrode 9 may be a replicated signal of the first touch-electrode signal S3, which is output from the first touch electrode 7 in response to the driving signal S2, and to a change in mutual capacitance between the first touch electrode 7 and second touch electrode 8. A display device 1B includes a shield-electrode signal generator 16B that supplies, to the shield electrode 9, the shield-electrode signal S1 being a replicated signal of the first touch-electrode signal S3.

As described above, the shield electrode 9 is driven by the shield-electrode signal S1 that is a replicated signal of the first touch-electrode signal S3 having the same frequency and phase as the driving signal S2 for synchronization and being analogous, in order to reduce a further parasitic bonding between the first touch electrode 7 and shield electrode 9. To synchronize the shield-electrode signal S1 with the driving signal S2, an inverter, a replicator, a splitter, and a buffer amplifier can be used as the shield-electrode signal generator 16B.

Second Embodiment

Figure 13:
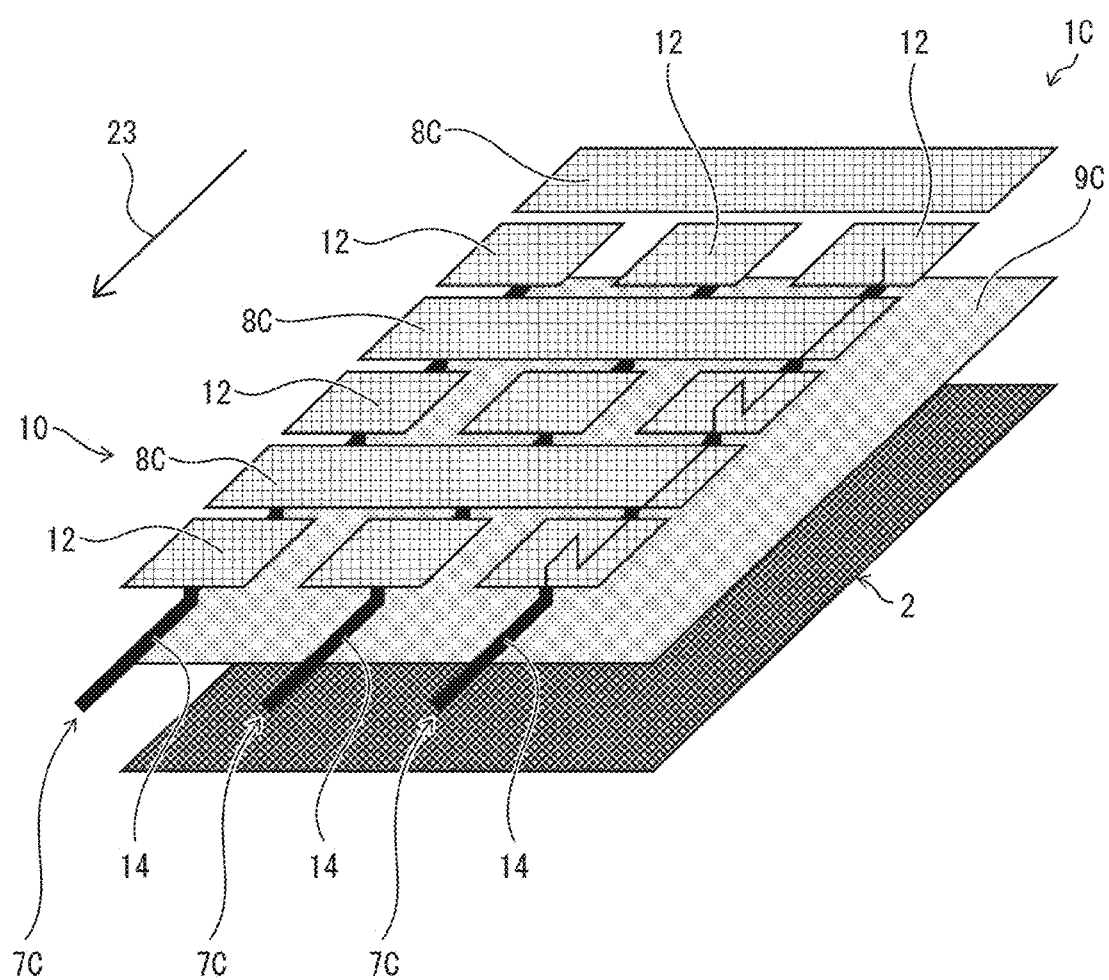
FIG. 13 is a perspective view of a display device according to a second embodiment and illustrates the relationship between its first and second touch electrodes, its shield electrode, and its display panel.

FIG. 13 is a perspective view of a display device 1C according to the second embodiment and illustrates the relationship between its first and second touch electrodes 7C and 8C, its shield electrode 9C, and the display panel 2. Constituents similar to the foregoing constituents will be denoted by similar reference signs, and the detailed description of these constituents will not be repeated.

The shapes of the first touch electrode and second touch electrode are not limited to the repeated pattern of diamonds described earlier with reference to FIG. 4. The display device 1C includes the following: a plurality of second touch electrodes 8C formed in a touch electrode layer 10 so as to extend in a striped manner in a direction intersecting with the arrow 23, which denotes the scanning direction of an image that is to be displayed on the display panel 2; and a plurality of first touch electrodes 7C formed along the arrow 23.

Each first touch electrode 7C includes the following: a plurality of touch pads 12 arranged along the arrow 23 between the second touch electrodes 8C adjacent to each other; and the bridge wire 14 (connection wire) formed in the shield electrode layer 11 to avoid intersection with the second touch electrodes 8C.

The display device 1C includes the shield electrode 9C formed in common in the plurality of first touch electrodes 7C so as to cover the entire display panel 2.

Figure 14:
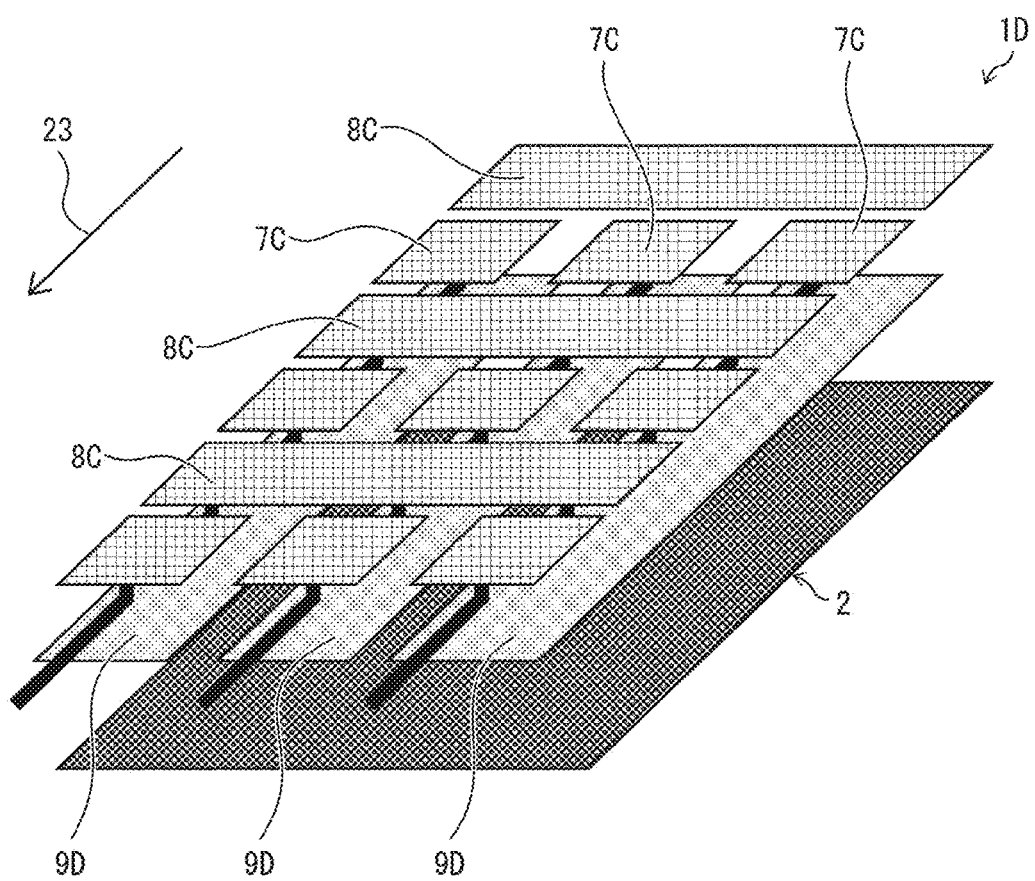
FIG. 14 is a perspective view of another display device according to the second embodiment and illustrates the relationship between its first and second touch electrodes, its shield electrode, and its display panel.

FIG. 14 is a perspective view of another display device 1D according to the second embodiment and illustrates the relationship between the first and second touch electrodes 7C and 8C, its shield electrode 9D, and the display panel 2. Constituents similar to the foregoing constituents will be denoted by similar reference signs, and the detailed description of these constituents will not be repeated.

The display device 1D includes a plurality of shield electrodes 9D patterned so as to correspond to the plurality of first touch electrodes 7C extending along the arrow 23. The plurality of shield electrodes 9D patterned like this can be applied with shield-electrode signals different from each other.

Third Embodiment

Figure 15:
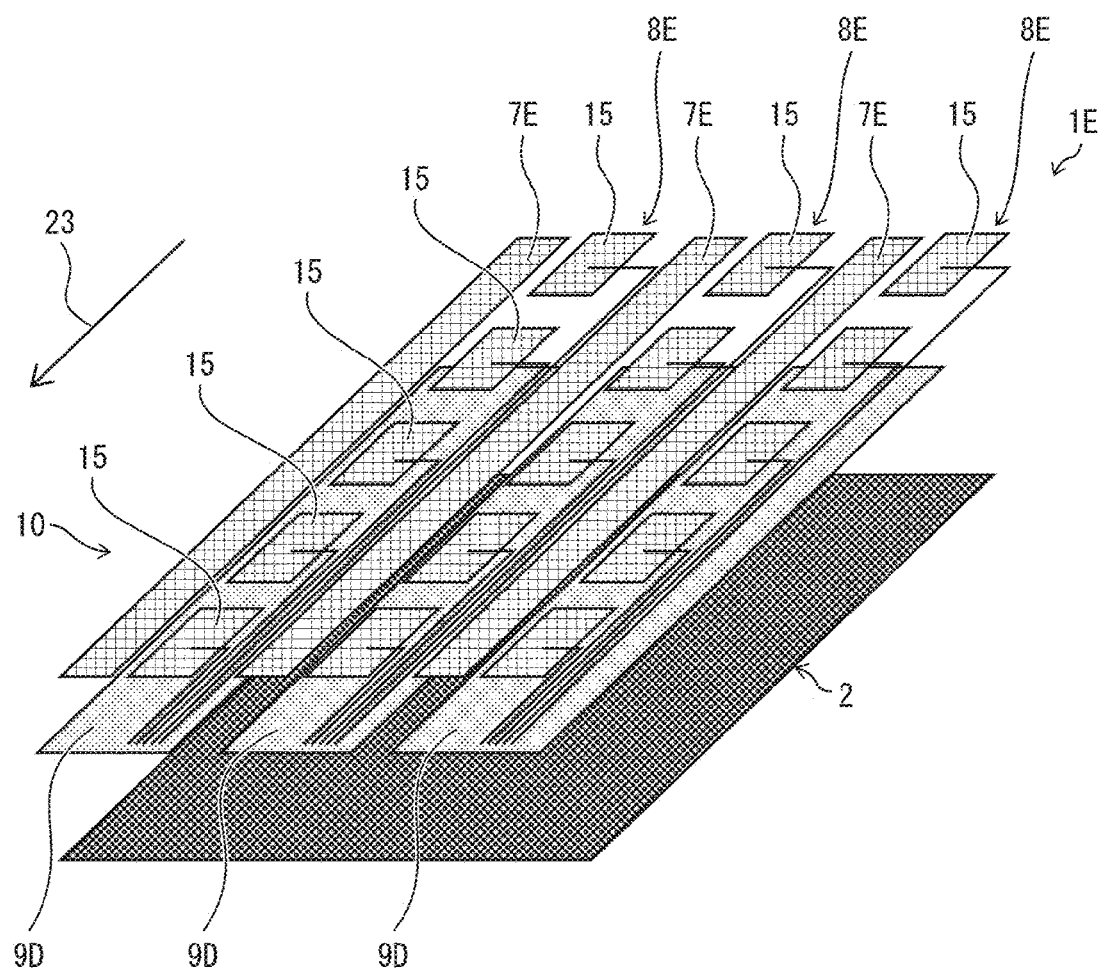
FIG. 15 is a perspective view of a display device according to a third embodiment and illustrates the relationship between its first and second touch electrodes, its shield electrode, and its display panel.

FIG. 15 is a perspective view of a display device 1E according to the third embodiment and illustrates the relationship between its first and second touch electrodes 7E and 8E, its shield electrode 9D, and the display panel 2. Constituents similar to the foregoing constituents will be denoted by similar reference signs, and the detailed description of these constituents will not be repeated.

The display device 1E includes the following: a plurality of first touch electrodes 7E in the form of stripes extending along the arrow 23, which denotes the scanning direction; a second touch electrode 8E including a plurality of touch pads 15 disposed along the arrow 23 at predetermined intervals between the first touch electrodes 7E adjacent to each other; and a plurality of shield electrodes 9D patterned so as to correspond to the plurality of first touch electrodes 7E extending along the arrow 23.

As described above, the first touch electrodes 7E and second touch electrode 8E can be formed in the touch electrode layer 10, which is a completely single layer.

Fourth Embodiment

Figure 16:
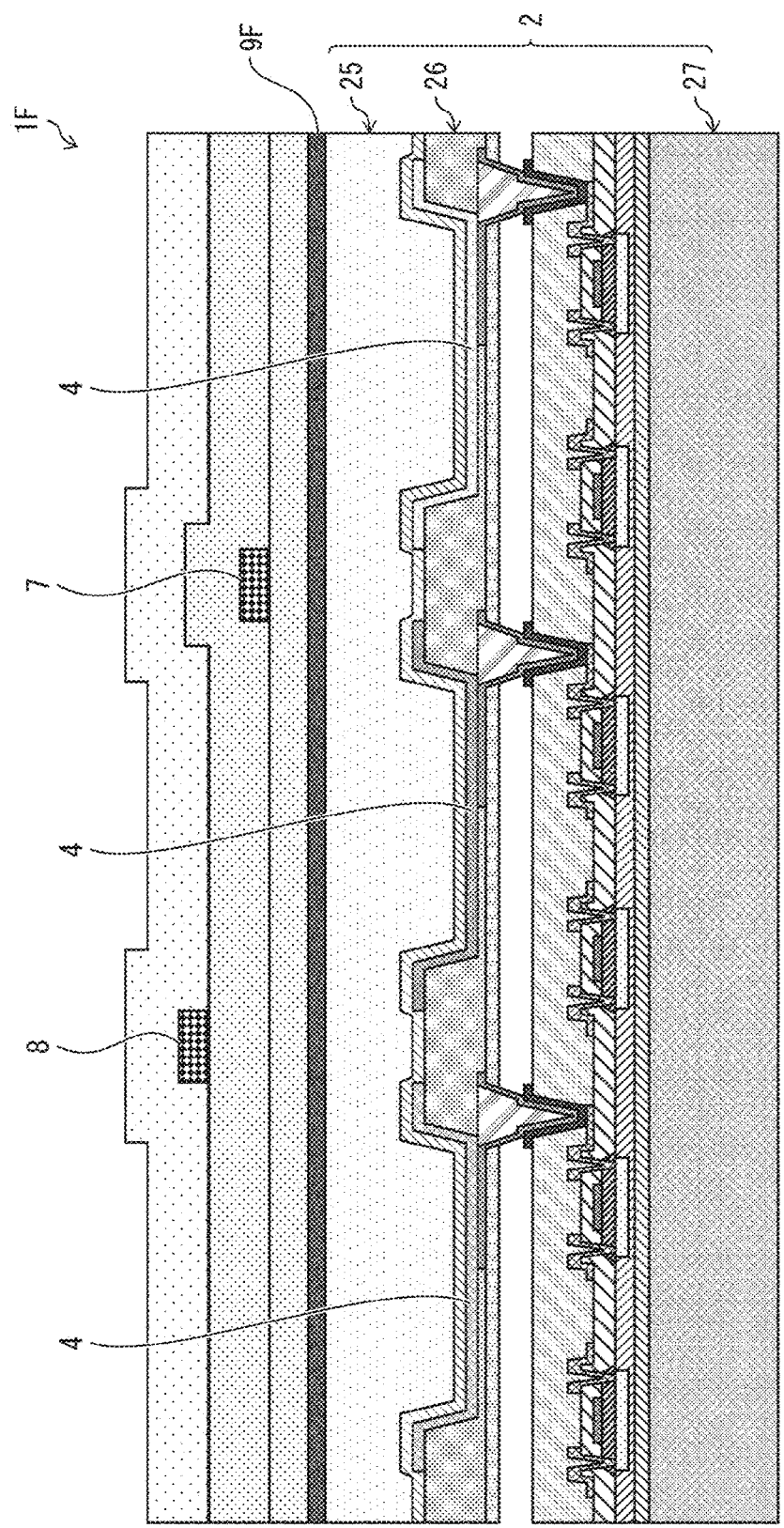
FIG. 16 is a sectional view of a display device according to a fourth embodiment.
Figure 17:
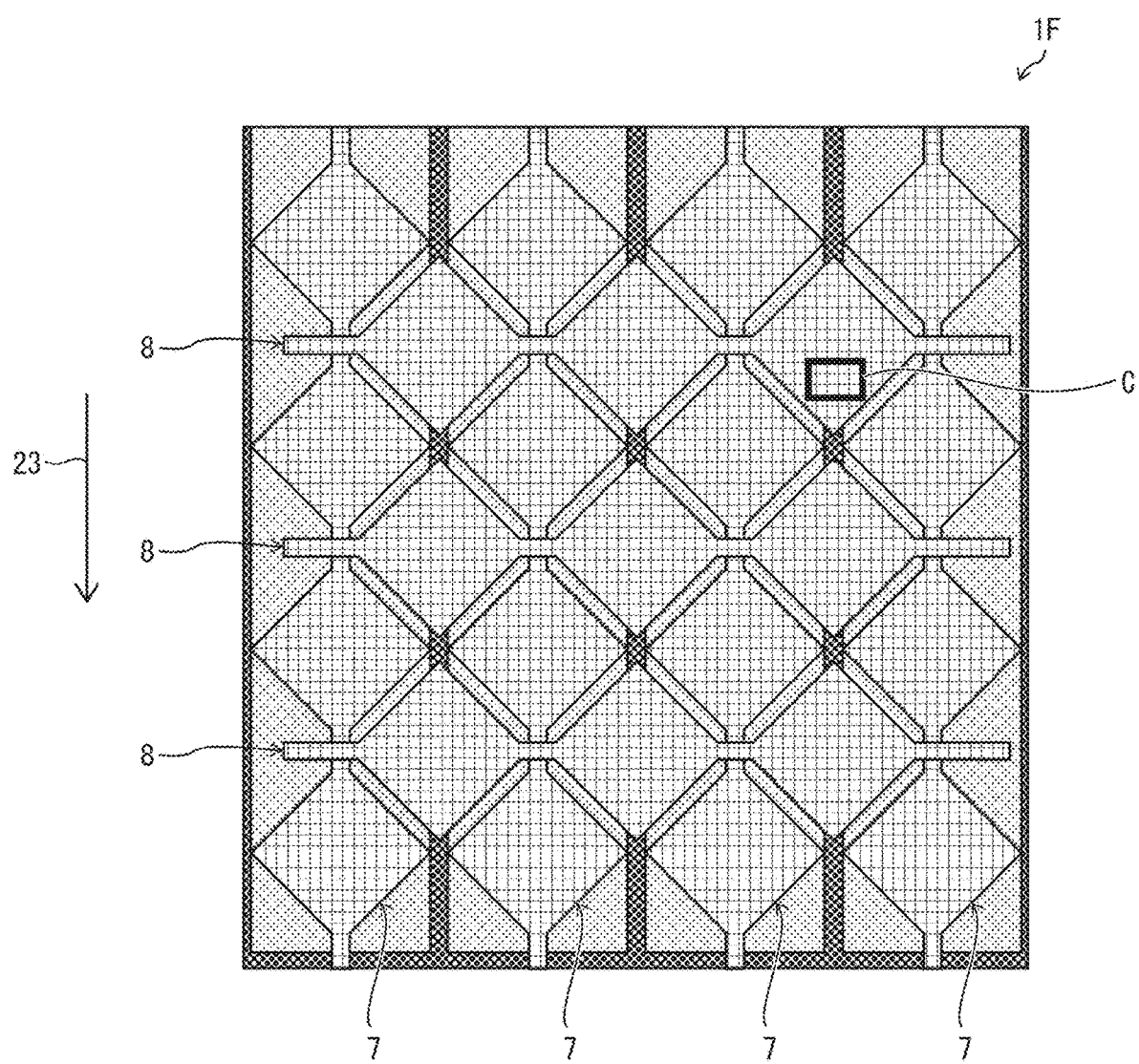
FIG. 17 is a plan view of the display device.
Figure 18:
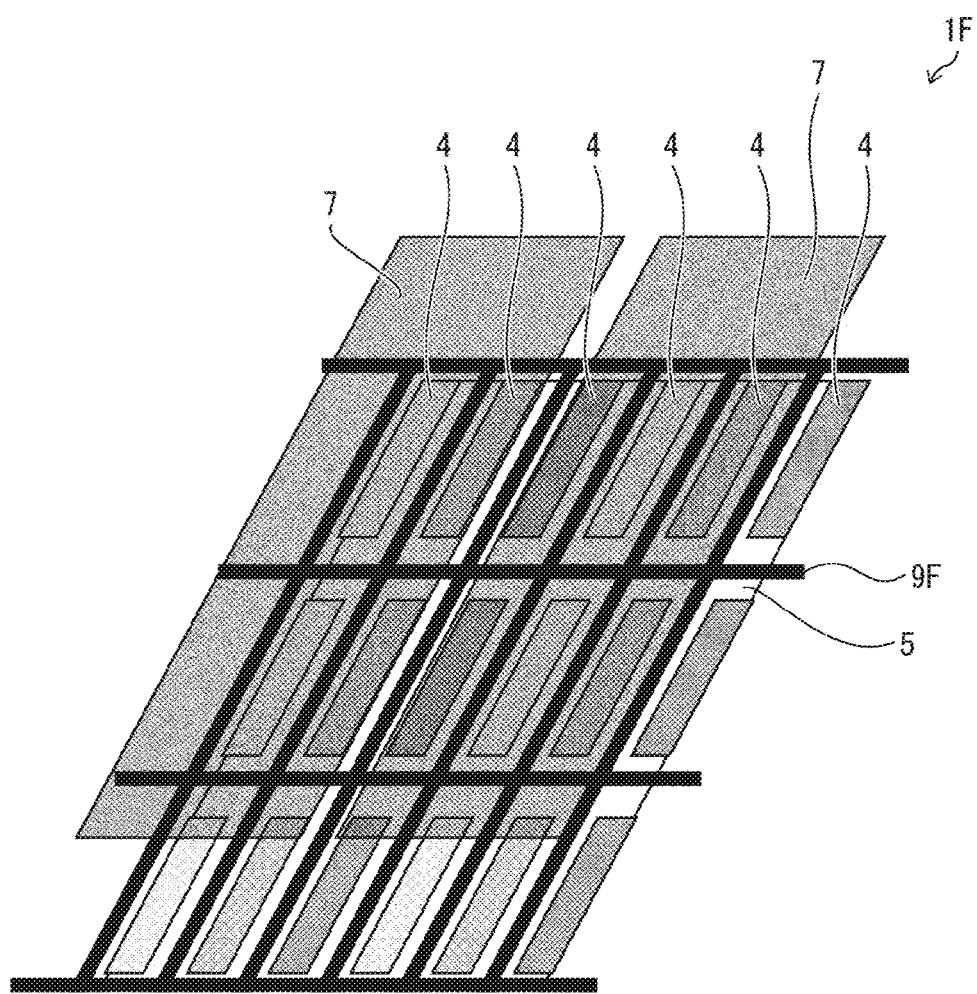
FIG. 18 is a detailed perspective view of a portion C illustrated in FIG. 17.

FIG. 16 is a sectional view of a display device 1F according to the fourth embodiment. FIG. 17 is a plan view of the display device 1F. FIG. 18 is a detailed perspective view of a portion C illustrated in FIG. 17. Constituents similar to the foregoing constituents will be denoted by similar reference signs, and the detailed description of these constituents will not be repeated.

The light-emitting layer 4 of the display panel 2 is composed of a plurality of light-emitting layers 4 arranged in rows and columns. The display panel 2 has a plurality of light-emission regions corresponding to the respective light-emitting layers 4, and a non-light-emission region formed between the light-emission regions adjacent to each other. The display device 1F includes a shield electrode 9F formed in a meshed manner and disposed in a location corresponding to the non-light-emission region.

Figure 19:
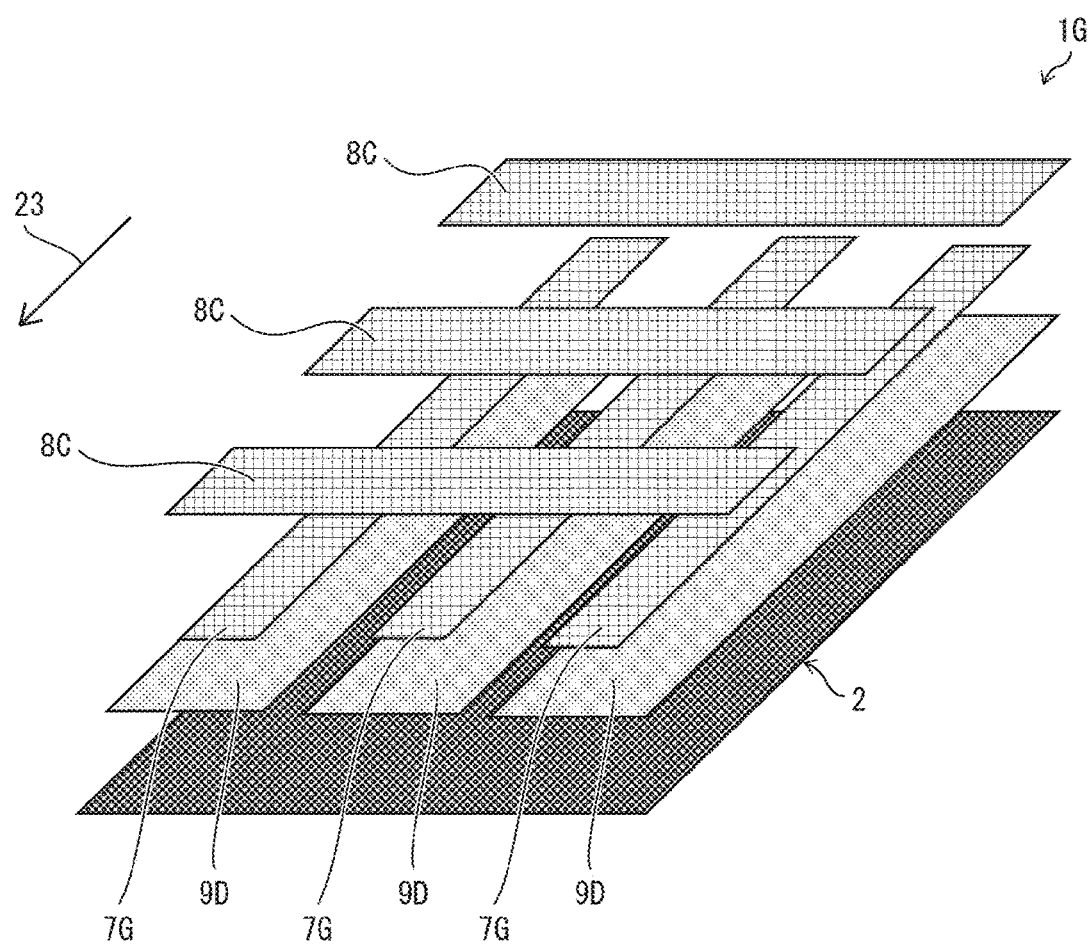
FIG. 19 is a perspective view of another display device according to the fourth embodiment and illustrates the relationship between its first and second touch electrodes, its shield electrode, and its display panel.

FIG. 19 is a perspective view of another display device 1G according to the fourth embodiment and illustrates the relationship between its first and second touch electrodes 7G and 8C, the shield electrode 9D, and the display panel 2. Constituents similar to the foregoing constituents will be denoted by similar reference signs, and the detailed description of these constituents will not be repeated.

The display device 1G includes the following: a plurality of first touch electrodes 7G in the form of stipes extending along the arrow 23, which denotes the scanning direction; a plurality of second touch electrodes 8C in the form of stripes extending in a direction intersecting with the arrow 23; and the shield electrodes 9D extending in correspondence with the plurality of respective first touch electrodes 7G.

Fifth Embodiment

Figure 20:
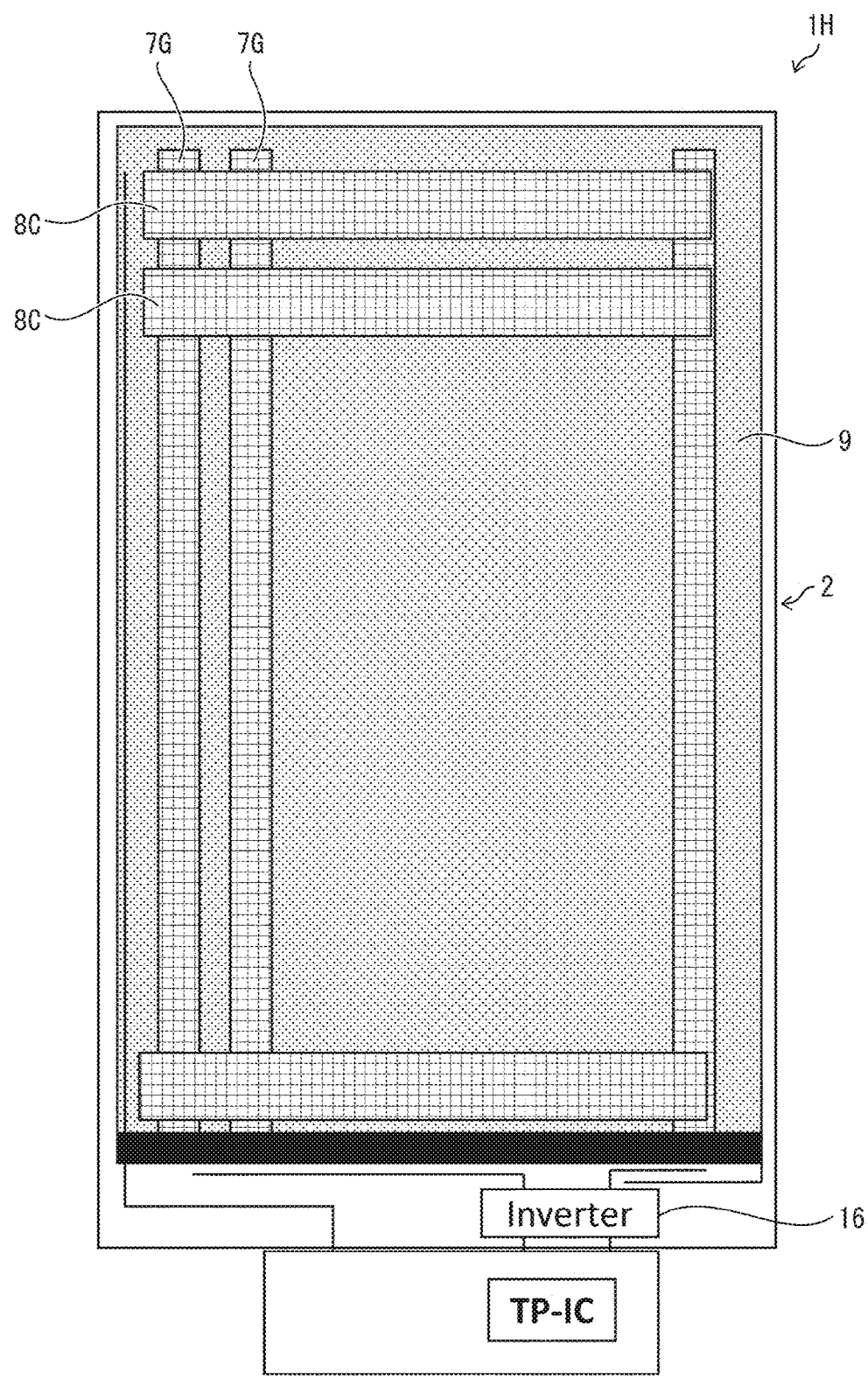
FIG. 20 is a plan view of a display device according to a fifth embodiment.
Figure 21:
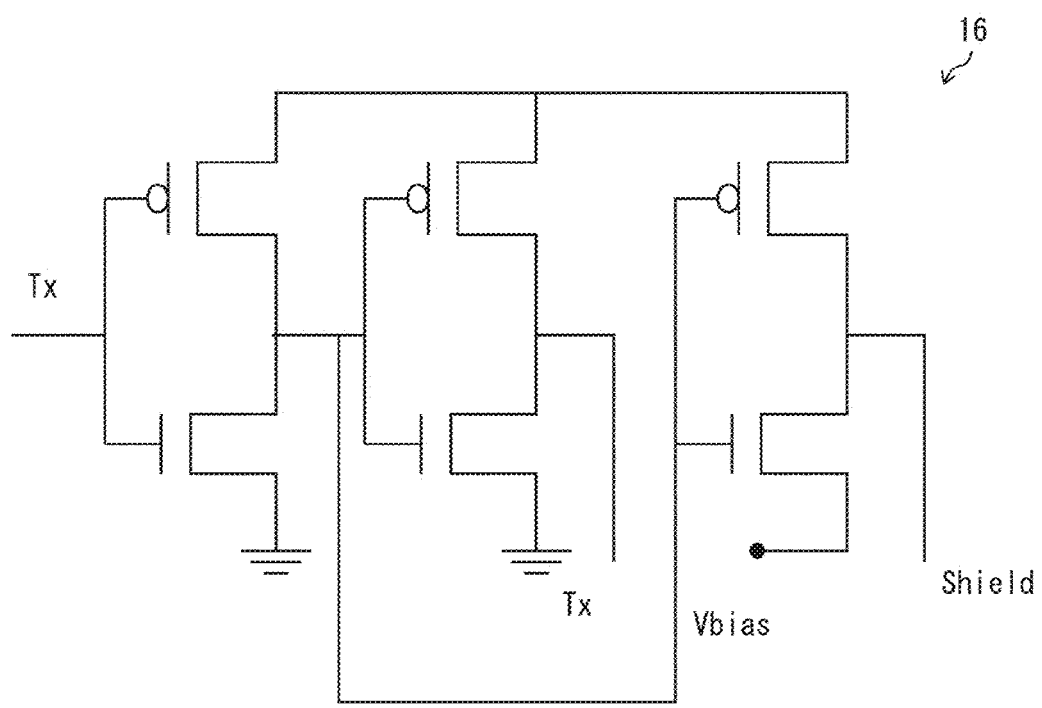
FIG. 21 is a circuit diagram of a shield-electrode signal generator provided in the display device.

FIG. 20 is a plan view of a display device 1H according to the fifth embodiment. FIG. 21 is a circuit diagram of the shield-electrode signal generator 16 provided in the display device 1H. Constituents similar to the foregoing constituents will be denoted by similar reference signs, and the detailed description of these constituents will not be repeated.

The shield-electrode signal generator 16 that replicates the driving signal S2 for driving the second touch electrode 8 can be an inverter composed of the thin-film transistors 22 for driving the light-emitting layer 4 of the display panel 2, a replicator composed of the same, or a multiplexer composed of the same. The thin-film transistors 22 are formed on the backplane 27. The amplitude of a signal on the shield electrode 9 can be regulated by the voltage, Vbias, of the shield-electrode signal generator 16.

Sixth Embodiment

Figure 22:
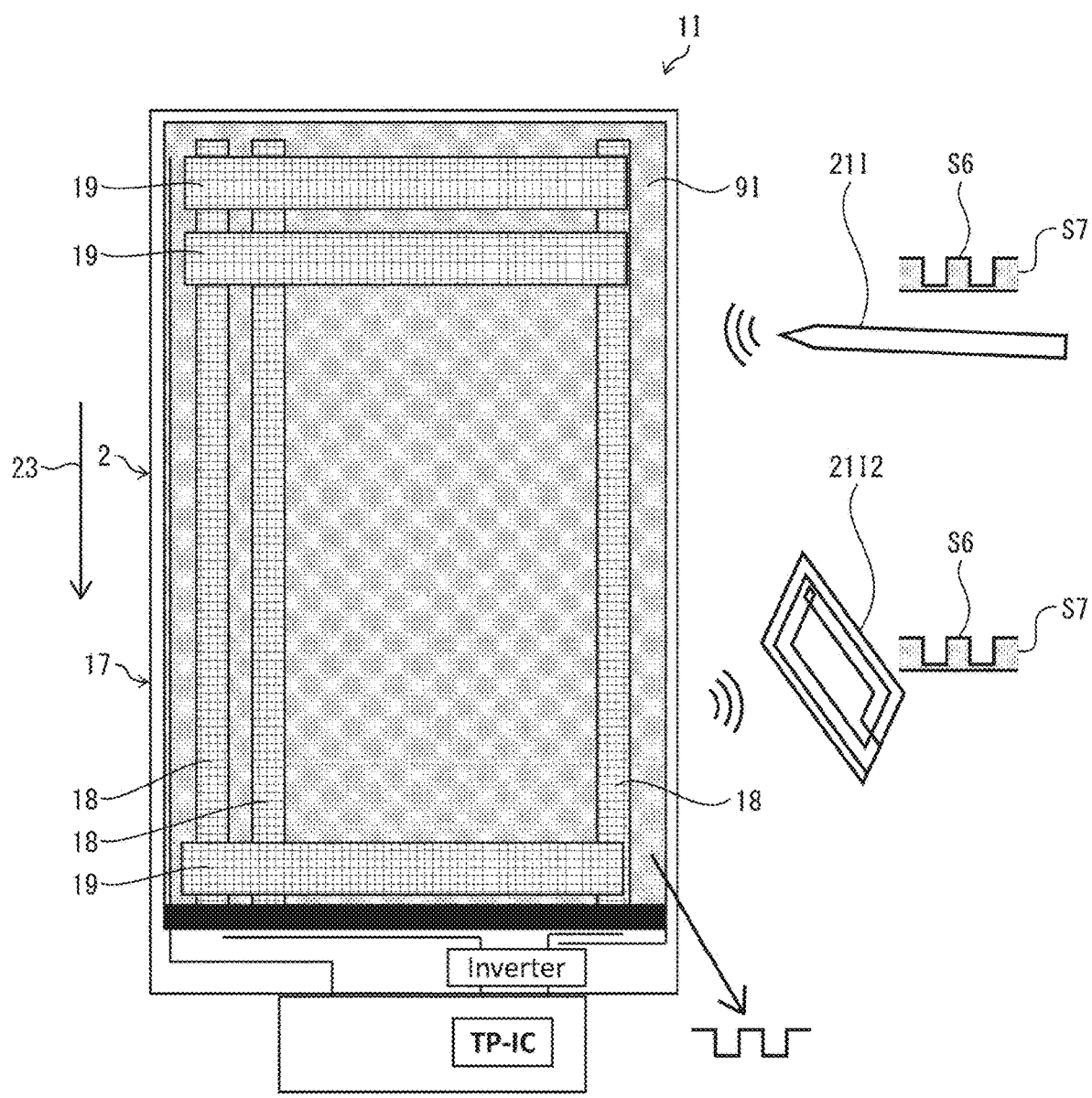
FIG. 22 is a schematic diagram of a display device according to a sixth embodiment.
Figure 23:
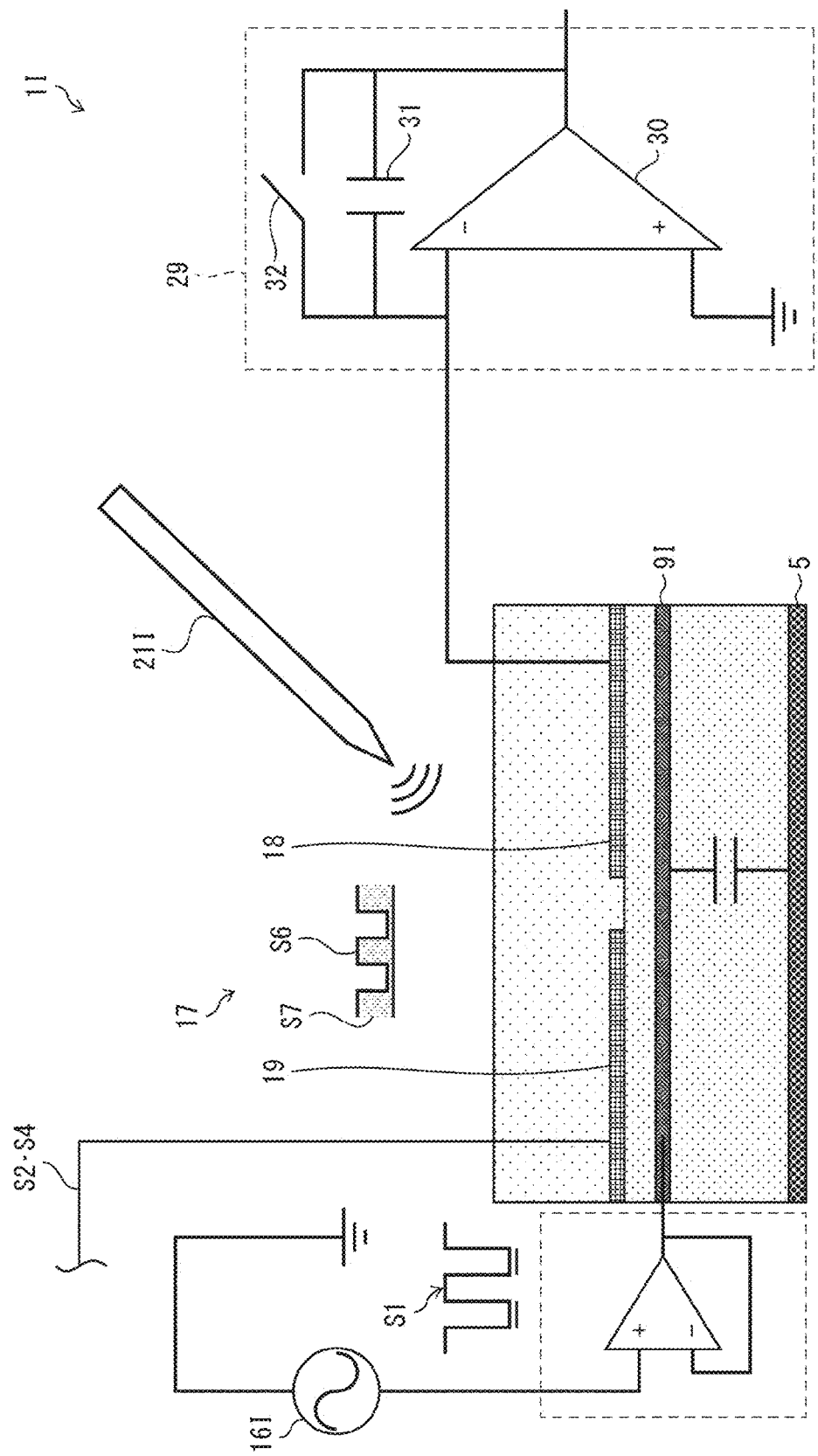
FIG. 23 is a schematic diagram illustrating an operational principle of a shield electrode provided in the display device.

FIG. 22 is a schematic diagram of a display device 1I according to the sixth embodiment. FIG. 23 is a schematic diagram illustrating an operational principle of a shield electrode provided in the display device 1I. Constituents similar to the foregoing constituents will be denoted by similar reference signs, and the detailed description of these constituents will not be repeated.

The display device 1I includes the following: the display panel 2 for displaying an image; and a recognition panel 17 formed over the display panel 2 to detect an approach of a detection target 21I1 or 21I2 to the display panel 2. The detection target 21I1 is an active stylus pen for instance. The detection target 21I2 is, for instance, a near-field communication (NFC) card including a radio-frequency-identifier (RFID) chip.

The display panel 2 has the following: the light-emitting layer 4 that emits light to display an image; the first electrode 5 disposed closer to the recognition panel 17 than the light-emitting layer 4, to apply a voltage to the light-emitting layer 4; and the second electrode 6 disposed opposite the recognition panel 17 with respect to the light-emitting layer 4, to apply the voltage to the light-emitting layer 4.

The recognition panel 17 has the following: a first recognition electrode 18; and a second recognition electrode 19 that, in a sensing mode for recognizing an approach of the detection target 21I1 or 21I2, is driven by a recognition signal S4 for recognizing the approach of the detection target 21I1 or 21I2 in response to a change in mutual capacitance between the first recognition electrode 18 and second recognition electrode 19.

The display device 1I further includes a shield electrode 9I formed between the first electrode 5 and recognition panel 17 to reduce a noise from the first electrode 5 to the recognition panel 17, and that is applied with the shield-electrode signal S1 related to the detection target 21I1 or 21I2.

The detection target 21I1 or 21I2 transmits a carrier frequency signal S6, and a modulation signal S7 corresponding to the carrier frequency signal S6.

The shield-electrode signal S1 includes a signal based on the modulation signal S7. The recognition signal S4 includes a signal based on the modulation signal S7.

In a touch detecting mode for detecting a touch to the display panel 2, the second recognition electrode 19 is driven by the driving signal S2 for detecting the touch, and a signal based on the driving signal S2 is applied to the shield electrode 9I.

As described above, the recognition panel 17 has the touch detecting mode for detecting a touch to the display panel 2, and the sensing mode for recognizing an approach of the detection target 21I1 or 21I2. The shield electrode 9I is, in the sensing mode, applied with the shield-electrode signal S1 based on the modulation signal S7 from the detection target 21I1 or 21I2. Accordingly, the recognition panel 17 that functions as a touch panel in the touch detecting mode recognizes an approach of the detection target 21I1 or 21I2 in the sensing mode. The detection target 21I1 or 21I2 can use the carrier frequency signal S6 different from the modulation signal S7.

The modulation signal S7 from the detection target 21I1 or 21I2 is a signal analogous to the driving signal S2 that is applied to the second recognition electrode 19 of the recognition panel 17. The recognition panel 17 that functions as a touch panel can detect the detection target 21I1 or 21I2 even when the frequency of the carrier frequency signal S6 is different from the frequency of the driving signal S2 that is applied to the second recognition electrode 19 of the recognition panel 17.

To reduce a noise on the recognition panel 17, the shield electrode 9I is driven by a signal based on the modulation signal S7 from the detection target 21I1 or 21I2.

Seventh Embodiment

Figure 24:
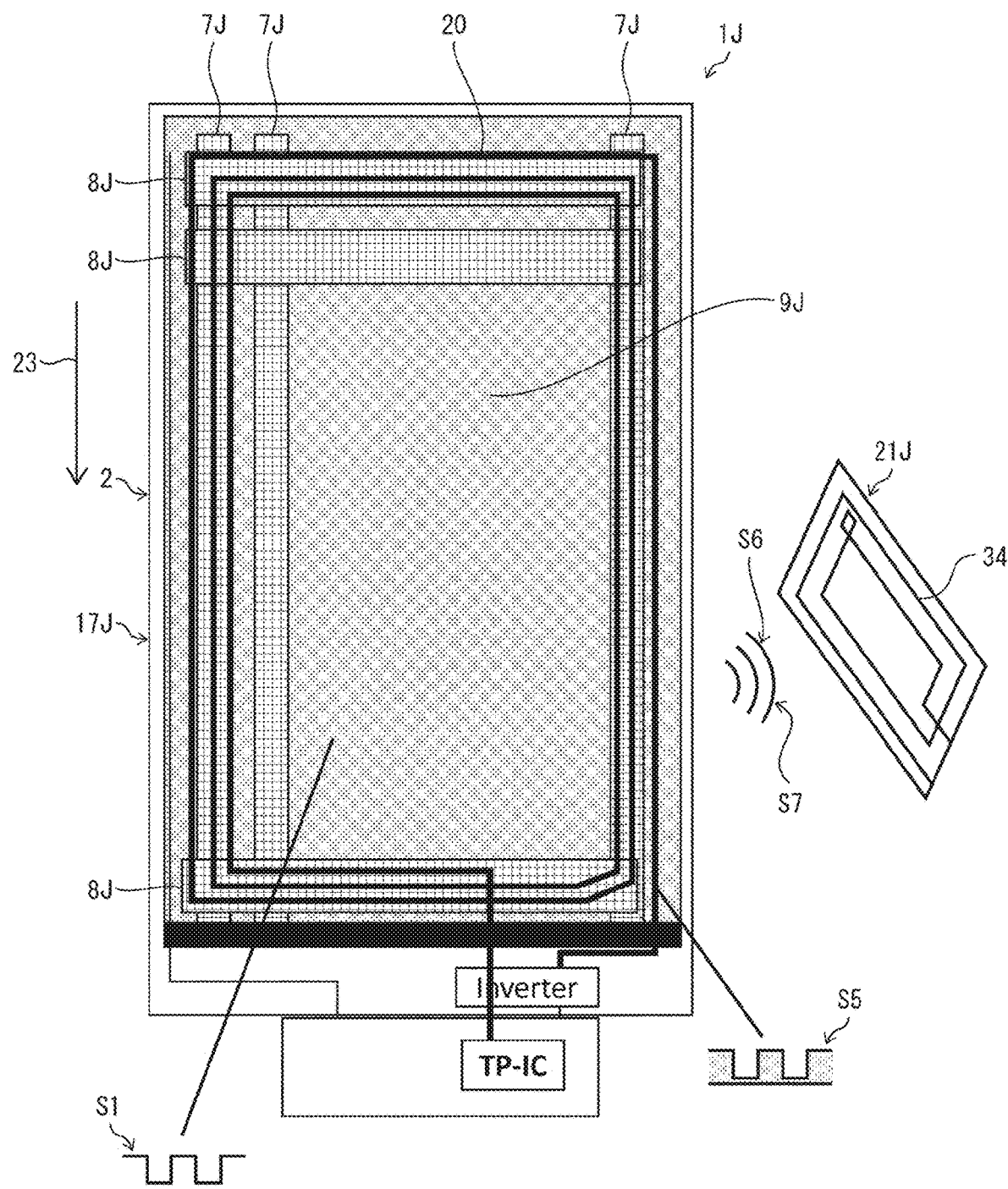
FIG. 24 is a schematic diagram of a display device according to a seventh embodiment.

FIG. 24 is a schematic diagram of a display device 1J according to the seventh embodiment. Constituents similar to the foregoing constituents will be denoted by similar reference signs, and the detailed description of these constituents will not be repeated.

The display device 1J includes the following: the display panel 2 for displaying an image; and a recognition panel 17J formed over the display panel 2 to recognize an approach of a detection target 21J having a coil 34 to the display panel 2 through electromagnetic induction. The detection target 21J is, for instance, an NFC card including an RFID chip.

The recognition panel 17J has an antenna electrode 20 formed in a looped manner to recognize an approach of the detection target 21J in response to a change in electromagnetic field, and that, in a sensing mode for recognizing the approach of the detection target 21J, is applied with an antenna-electrode signal S5 related to the detection target 21J.

The display device 1J further includes a shield electrode 9J formed between the first electrode 5 and recognition panel 17J to reduce a noise from the first electrode 5 to the recognition panel 17J. The shield-electrode signal S1 related to the detection target 21J is applied to the shield electrode 9J.

The detection target 21J transmits the carrier frequency signal S6, and the modulation signal S7 corresponding to the carrier frequency signal S6. The antenna-electrode signal S5 includes a signal based on the carrier frequency signal S6 and modulation signal S7. The shield-electrode signal S1 includes a signal based on the modulation signal S7.

The recognition panel 17J further has the following: a first touch electrode 7J; and a second touch electrode 8J that, in a touch detecting mode for detecting a touch to the display panel 2, is driven by the driving signal S2 for detecting the touch to the display panel 2 in response to a change in mutual capacitance between the first touch electrode 7J and second touch electrode 8J. In the touch detecting mode, the shield-electrode signal S1 based on the driving signal S2 is applied to the shield electrode 9J.

As described above, in the sensing mode, the antenna-electrode signal S5 based on the carrier frequency signal S6 and modulation signal S7 from the detection target 21J is applied to the antenna electrode 20, which is provided in the recognition panel 17J of the display device 1J. Moreover, the shield electrode 9J is driven by the shield-electrode signal S1 based on the modulation signal S7 from the detection target 21J.

In the touch detecting mode, the shield electrode 9J is driven by the shield-electrode signal S1 based on the driving signal S2.

The disclosure is not limited to the foregoing embodiments. Various modifications can be devised within the scope of the claims. An embodiment that is obtained in combination, as appropriate, with the technical means disclosed in the respective embodiments is also included in the technical scope of the disclosure. Furthermore, combining the technical means disclosed in the respective embodiments can form a new technical feature.

The invention claimed is:

1. A display device comprising:
a display panel for displaying an image;
a shield electrode; and
a recognition panel formed over the display panel to recognize an approach of a detection target to the display panel,
wherein:
the display panel has;
a light-emitting layer that emits light to display the image,
a first electrode disposed closer to the recognition panel than the light-emitting layer, such that to apply a voltage to the light-emitting layer, and
a second electrode disposed opposite the recognition panel with respect to the light-emitting layer, such that to apply the voltage to the light-emitting layer,
the recognition panel has:
a first recognition electrode, and
a second recognition electrode that, in a sensing mode for recognizing the approach of the detection target, is driven by a recognition signal for recognizing the approach of the detection target in response to a change in mutual capacitance between the first recognition electrode and the second recognition electrode,
the shield electrode is formed between the first electrode and the recognition panel to reduce a noise that is received from the first electrode by the recognition panel and that is applied with a shield-electrode signal related to the detection target,
the detection target transmits a carrier frequency signal and a modulation signal corresponding to the carrier frequency signal, and
the shield-electrode signal includes a signal that is associated with the modulation signal.

2. The display device according to claim 1, wherein the recognition signal includes a signal that is associated with the modulation signal.

3. The display device according to claim 1, wherein, in a touch detecting mode for detecting a touch on the display panel, the second recognition electrode is further driven by a driving signal for detecting the touch, and the shield electrode is applied with a signal that is associated with the driving signal.

4. A display device comprising:
a display panel for displaying an image;
a shield electrode; and
a recognition panel formed over the display panel to recognize an approach of a detection target, having a coil, to the display panel through electromagnetic induction,
wherein:
the display panel has:
a light-emitting layer that emits light to display the image,
a first electrode disposed closer to the recognition panel than the light-emitting layer, such that to apply a voltage to the light-emitting layer, and
a second electrode disposed opposite the recognition panel with respect to the light-emitting layer, such that to apply the voltage to the light-emitting layer,
the recognition panel has an antenna electrode formed in a looped manner to recognize the approach of the detection target in response to a change in an electromagnetic field, and that, in a sensing mode for recognizing the approach of the detection target, is applied with an antenna-electrode signal associated with the detection target,
the shield electrode is formed between the first electrode and the recognition panel to reduce a noise received from the first electrode by the recognition panel,
a shield-electrode signal associated with the detection target is applied to the shield electrode,
the detection target transmits a carrier frequency signal and a modulation signal corresponding to the carrier frequency signal,
the antenna-electrode signal includes a signal that is associated with the carrier frequency signal and the modulation signal, and
the shield-electrode signal includes a signal that is associated with the modulation signal.

5. The display device according to claim 4, wherein;
the recognition panel further has:
a first touch electrode, and
a second touch electrode that, in a touch detecting mode for detecting a touch on the display panel, is driven by a driving signal for detecting the touch on the display panel in response to a change in mutual capacitance between the first touch electrode and the second touch electrode, and
in the touch detecting mode, a signal associated with the driving signal is applied to the shield electrode.

* * * * *